Oct. 11, 1960 W. EBBINGE 2,956,159

DETECTOR SYSTEM

Filed Aug. 5, 1955

INVENTOR
WILLEM EBBINGE

BY Fred M. Vogel
AGENT 2,956,159

DETECTOR SYSTEM

Willem Ebbinge, Eindhoven, Netherlands, assignor, by mesne assignments, to North American Philips Company, Inc., New York, N.Y., a corporation of Delaware Filed Aug. 5, 1955, Ser. No. 526,593

Claims priority, application Netherlands Aug. 17, 1954

6 Claims. (Cl. 250—31)

This invention concerns detector systems and more particularly, detector systems utilizing output transistors.

The principal object of this invention is the provision of a detector system having a new and improved coupling network between the output of a detector circuit and the input of an output transistor.

An object of this invention is the provision of a detector system with greatly reduced detection distortion.

Another object of this invention is the provision of a detector system with greatly increased detection efficiency.

A further object of this invention is the provision of a detector system having a new and improved coupling network adapted for connection between the output of an amplitude or frequency-modulated detector and the input of an output transistor.

Detector systems utilizing transistors have previously been proposed in which the output signal of a detector is supplied to the series combination of a resistance, which is by passed with respect to the frequency of said signal, and the primary winding of a step-down transformer; the secondary winding of the transformer being connected in the input of a transistor. The transformer serves to transform the input impedance of the transistor to a high value, so that the reactance of the detector output filter is approximately equal to the direct current resistance of said filter, in order to reduce detection distortion. That is, the transformer transforms the input impedance of the transistor to a high value, so that it is approximately equal to the bypassed resistance of the output filter, in order to reduce detection distortion.

In the detector system of the present invention, the output signal of the detector is supplied to the input of the transistor through a coupling network comprising a resistor connected in parallel with a capacitor. The capacitor bypasses the resistance, with respect to the frequencies of the output signal of the detector, without the utilization of a matching transformer. In the detector system of the present invention, the reactance of the detector output filter is considerably lower than its direct current resistance. Rather than increase the detection distortion, however, this decreases the detection distortion, as is shown in Fig. 2.

The above and other objects of the invention will become apparent from a consideration of the following detailed description taken in connection with the accompanying drawings, in which.

Figure 1:
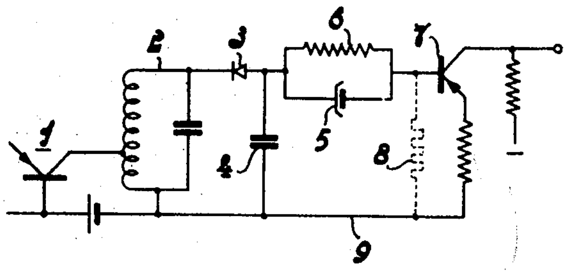
Fig. 1 is a schematic diagram of an embodiment of the detector system of the present invention.

In Fig. 1, a carrier wave having amplitude variations indicative of intelligence is applied through an amplifier stage 1 to a parallel resonant circuit 2 of an amplitude modulation detector. The intelligence is derived by a rectifier 3 and appears across the detector output capacitor 4. This intelligence is applied to the input base electrode of a transistor 7 through a coupling network comprising a resistor 6 connected in parallel with a capacitor 5. The transistor 7 is in grounded emitter connection, its emitter electrode being connected to the common line 9, and its collector electrode providing the output of the system.

Figure 2:
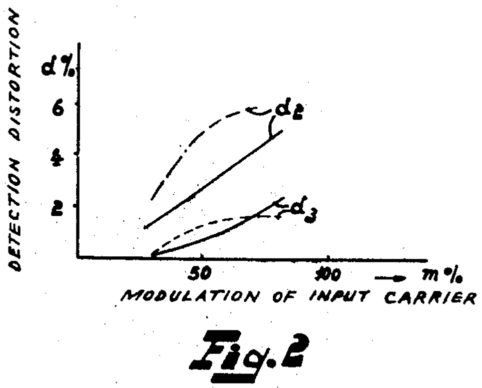
Fig. 2 is a series of curves illustrating the manner of reduction of detection distortion of the detector system of the present invention.

In Fig. 2, the abscissa of the curves is the modulation of the carrier wave supplied to the detector by the intelligence variations in percent and the ordinate is the detection distortion of the intelligence derived by the detector in percent. The solid-line curve $d_2$ represents the percentage of second harmonic distortion in the intelligence derived by the detector and the solid-line curve $d_3$ represents the percentage of third harmonic distortion in the intelligence derived by the detector.

These distortion percentages are low despite the fact that the input impedance of the transistor 7, which is the reactance of the detector output filter 4, may be one-tenth the value of the coupling resistor 6, which is substantially the direct current resistance of said filter.

If the transistor 7 is replaced by a resistor 8, shown by dotted lines in Fig. 1, which may be equal in value to that of the coupling resistor 6, the distortion percentages increase, rather than decrease. The broken-line curve $d_2$ represents the percentage of second harmonic distortion in the intelligence derived by the detector and the broken-line curve $d_3$ represents the percentage of third harmonic distortion in the intelligence derived by the detector which appears across the resistor 8 when said resistor replaces the transistor 7.

It is thus seen that in a circuit arrangement of the present type, the condition according to which the A.C. impedance of the detector output filter should correspond to its direct current resistance, in order to avoid detection distortion, does not hold. As a matter of fact, said condition should be fulfilled in usual detector-circuit arrangements, since otherwise "clipping" of the rectifier 3 may occur. This risk is not involved in the present circuit arrangement, since at comparatively low values of the resistance 8, the modulation depth of the voltage produced across the circuit 2 also decreases on account of the higher circuit damping by the resistance 8, which effect counter-balances within wide limits the fact that the reactance of the detector output filter 4 is lower than its direct current resistance. The natural damping of the circuit 2, as well as the damping due to the internal collector resistance of the stage 1, should preferably be low.

In the embodiment of Fig. 1, the capacitor 4 may have a capacitance of 470 micromicrofarads; the capacitor 5 may have a capacitance of 8 microfarads; the resistor 6 may have a resistance of 100 kilohms. The transistor 7 may be of type OC 71 and its input impedance may be adjusted to from 8 to 12 kilohms. The signal across the resonant circuit 2 may vary from 100 to 1000 millivolts, and its resonance impedance is preferably greater than 40 kilohms.

Figure 3:
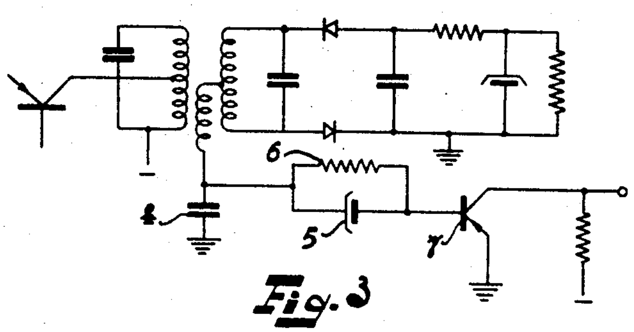
Fig. 3 is a schematic diagram of another embodiment of the detector system of the present invention.

In Fig. 3, a carrier wave having frequency variations indicative of intelligence is applied through an amplifier stage to a frequency modulation detector. The intelligence is derived by a pair of rectifiers and appears across the detector output capacitor 4. As in Fig. 1, the intelligence is applied to the input base electrode of a transistor 7 through a coupling network comprising a resistor 6 connected in parallel with a capacitor 5. The transistor 7 is in grounded emitter connection, its emitter electrode being connected to ground (the common line), and its collector electrode providing the output of the system.

The detector system may be varied without departing from the spirit or scope of the invention. In the figures, the transistor 7 may be in grounded base connection with the coupling network 5, 6 being connected to its emitter electrode. A small bias source may be connected in the common line to adjust the detection efficiency to a maximum, or the detector output capacitor 4 may be constituted by the input capacitance of the transistor 7.

It is to be understood that the invention is not limited to the details disclosed but includes all such variations and modifications as fall within the spirit of the invention and the scope of the appended claims.

Having thus set forth the nature of my invention, what I claim is:

1. A detector system for a signal in the form of a carrier wave having variations indicative of intelligence, comprising input means for said carrier wave, and a detector for deriving said intelligence from said carrier wave, said detector comprising an output electrode, said signal detecting means exhibiting a high source impedance, a transistor having an input resistance of relatively small value and an input electrode and an output electrode, and a coupling network comprising a resistive element having a resistance value greater than that of said input resistance and a capacitive element connected in parallel with said resistive element, said capacitive element having the required value of capacitance to allow said capacitive element to bypass said resistive element at the frequencies of said intelligence variations, said network being connected between the output electrode of said detector and the input electrode of said transistor and a load impedance connected to the output electrode of said transistor.

2. A detector system for a signal in the form of a carrier wave having variations indicative of intelligence, comprising input means for said carrier wave, a detector for deriving said intelligence from said carrier wave, said detector comprising an output electrode, said signal detecting means exhibiting a high source impedance, a transistor having an input resistance of relatively small value and a base electrode, an emitter electrode and a collector electrode, a coupling network comprising a resistive element having a resistance value greater than that of said input resistance and a capacitive element connected in parallel with said resistive element, said capacitive element having the required value of capacitance to allow said capacitive element to bypass said resistive element at the frequencies of said intelligence variations, said network being directly connected between the output electrode of said detector and the base electrode of said transistor, and means for connecting said omitter electrode to a point at ground potential, said collector electrode being connected to an output impedance.

3. A detector system for a signal in the form of a carrier wave having variations indicative of intelligence, comprising input means for said carrier wave, a detector for deriving said intelligence from said carrier wave, said detector comprising a first capacitor across which said intelligence is developed, said signal detecting means exhibiting a high source impedance, a transistor having an input resistance of relatively small value and a base, emitter and collector electrodes and a coupling network comprising a resistive element having a resistance value greater than that of said input resistance and a second capacitor connected to short circuit said resistive element for the frequencies of said intelligence variations, a closed loop comprising said first capacitor, said coupling network and said base and emitter electrodes of said transistor, and means for deriving said intelligence from the collector electrode of said transistor.

4. A detector system for a signal in the form of a carrier wave having amplitude variations indicative of intelligence, comprising input means for said carrier wave, an amplitude modulation detector for deriving said intelligence from said carrier wave comprising a parallel resonant circuit across which said carrier wave is applied, a rectifier and an output capacitor, a transistor having an input resistance, a base electrode, an emitter electrode and a collector electrode, a coupling network comprising a resistor having a resistance value greater than that of said input resistance and a capacitor connected in parallel with said resistor for bypassing said resistor at the frequencies of said intelligence variations, said network being connected between one terminal of said output capacitor and the base electrode of said transistor, the emitter electrode of said transistor being connected to the other terminal of said output capacitor, and means for deriving said intelligence from the collector electrode of said transistor.

5. A detector system for a signal in the form of a carrier wave having frequency variations indicative of intelligence, comprising input means for said carrier wave, a frequency modulation detector for deriving said intelligence from said carrier wave comprising a parallel resonant circuit across which said carrier wave is applied, a rectifier and an output capacitor, a transistor having an input resistance, a base electrode, an emitter electrode and a collector electrode, a coupling network comprising a resistor having a resistance value greater than that of said input resistance and a capacitor connected in parallel with said resistor for bypassing said resistor at the frequencies of said intelligence variations, said network being connected between one terminal of said output capacitor and the base electrode of said transistor, the emitter electrode of said transistor being connected to the other terminal of said output capacitor, and means for deriving said intelligence from the collector electrode of said transistor.

6. A detector system for a signal in the form of a carrier wave having variations indicative of intelligence within a given frequency range, comprising a rectifier, a parallel resonant circuit, a transistor having emitter and base electrodes defining an input circuit having a given input resistance and a collector electrode defining an output circuit, a resistor having a resistance value greater than that of said input resistance, a capacitor connected in parallel with said resistor for bypassing said resistor at frequencies within said given frequency range, means connecting said parallel resonant circuit and said rectifier in closed loop series circuit arrangement with said resistor and said input circuit, and means for applying said carrier wave to said parallel resonant circuit whereby detected and amplified intelligence is produced at said output circuit.

References Cited in the file of this patent

UNITED STATES PATENTS

| | | |
|---|---|---|
| 2,296,056 | Roberts | Sept. 15, 1942 |
| 2,296,092 | Crosby | Sept. 15, 1942 |
| 2,296,100 | Foster et al. | Sept. 15, 1942 |
| 2,666,817 | Raisbeck et al. | Jan. 19, 1954 |
| 2,733,359 | Brown | Jan. 31, 1956 |
| 2,802,938 | Herzog | Aug. 13, 1957 |
| 2,811,590 | Doremus et al. | Oct. 29, 1957 |

OTHER REFERENCES

Publication I, Tele-Tech & Electronic Industries, August 1953, pp. 79, 206, 207, "A Portable Transistor FM-Receiver," by Ballard.

Publication II, Electronic Design, December 1954, pp. 20, 21, "Miniature Transistor Radio."

Publication III, Radio Electronics, March 1954, pp. 84, 86, 87, 90, "High-Gain Low-Drain Portable Radio," by Queen.

Publication IV, Principles of Transistor Circuits, 1953, John Wiley and Sons, Inc., pp. 113, 114 by Shea.